United States Patent
Perry et al.

[11] Patent Number: 5,992,793
[45] Date of Patent: Nov. 30, 1999

[54] AEROFOIL

[75] Inventors: Frederick John Perry, Yeovil; Robert John Harrison, South Petherton; Alan Brocklehurst, Sherborne, all of United Kingdom

[73] Assignee: GKN Westland Helicopters Limited, Somerset, United Kingdom

[21] Appl. No.: 08/779,120

[22] Filed: Jan. 6, 1997

[30] Foreign Application Priority Data

Jan. 4, 1996 [GB] United Kingdom ............... 9600123

[51] Int. Cl.⁶ ............................................ B64C 3/14
[52] U.S. Cl. ..................... 244/17.11; 244/199; 416/228
[58] Field of Search ............... 244/17.11, 35 R, 244/199, 198, 130; 416/228

[56] References Cited

U.S. PATENT DOCUMENTS

| | | | |
|---|---|---|---|
| 2,014,242 | 9/1935 | Weichwald | 416/228 |
| 2,802,630 | 8/1957 | Birchill et al. | 244/35 R X |
| 3,712,564 | 1/1973 | Rethorst | 244/199 |
| 4,046,336 | 9/1977 | Tangler | 244/198 |
| 4,190,219 | 2/1980 | Hackett | 244/199 |
| 4,722,499 | 2/1988 | Klug | 244/199 |
| 5,199,851 | 4/1993 | Perry et al. | 416/228 X |
| 5,205,715 | 4/1993 | Perry et al. | 416/228 |
| 5,246,344 | 9/1993 | Perry | 416/228 |

FOREIGN PATENT DOCUMENTS

| | | |
|---|---|---|
| 2067493 | 7/1981 | United Kingdom . |
| WO 96/03215 | 2/1996 | WIPO . |

Primary Examiner—William Grant
Attorney, Agent, or Firm—Larson & Taylor

[57] ABSTRACT

An aerofoil comprises a leading edge and a trailing edge which define a mean chord length, and the aerofoil having an inner or root end adapted for attachment to an aircraft, and an outer end which includes a tip which is adapted in use to divide the airflow into two generally equal vortices one being an inner vortex and the other being an outer vortex the inner vortex being arranged to trail from an outer edge of a forward region of the tip and pass over a rear region of the tip.

15 Claims, 3 Drawing Sheets

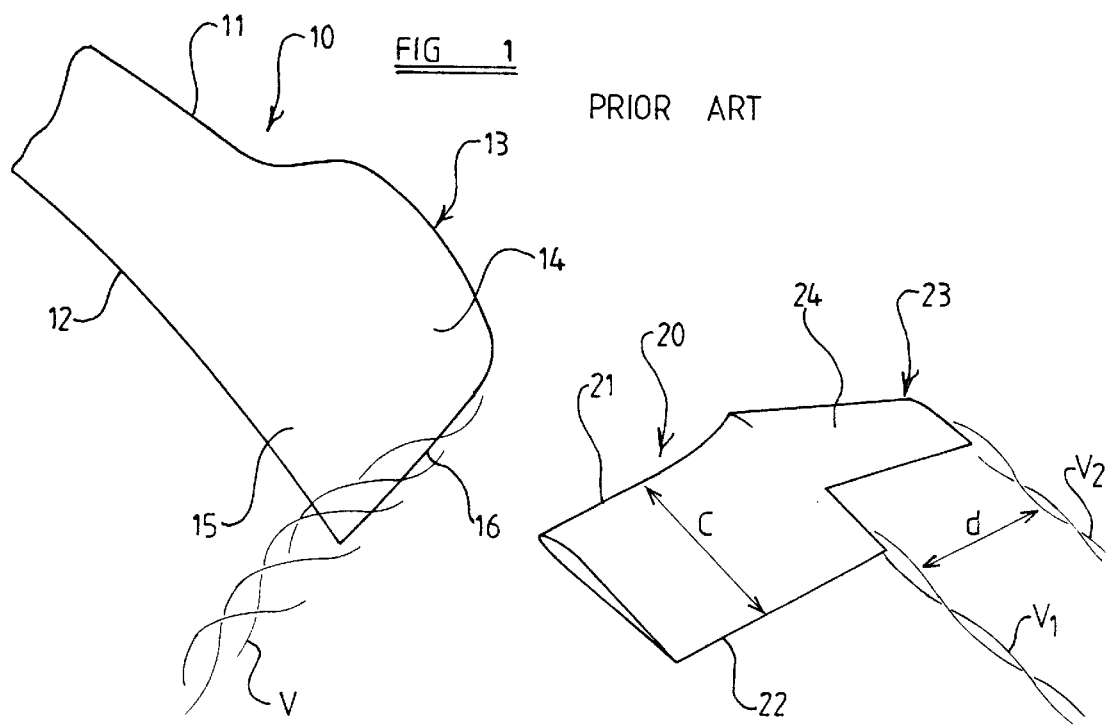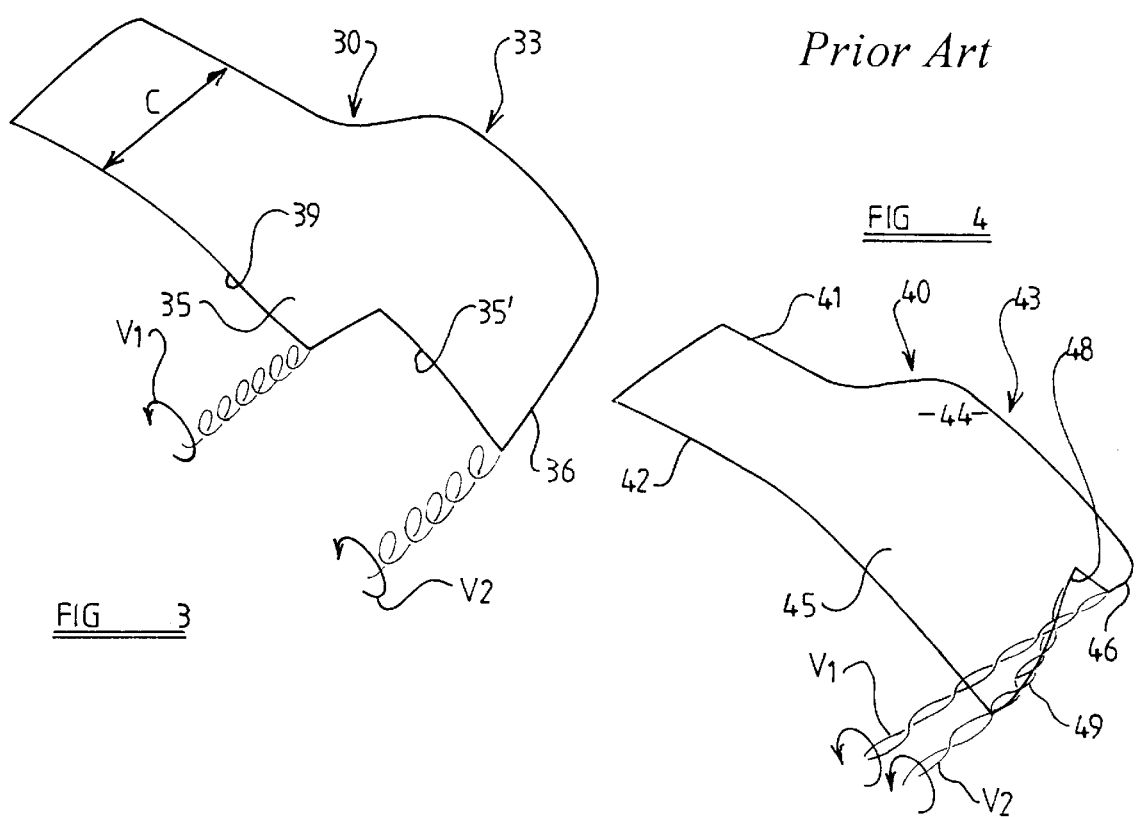

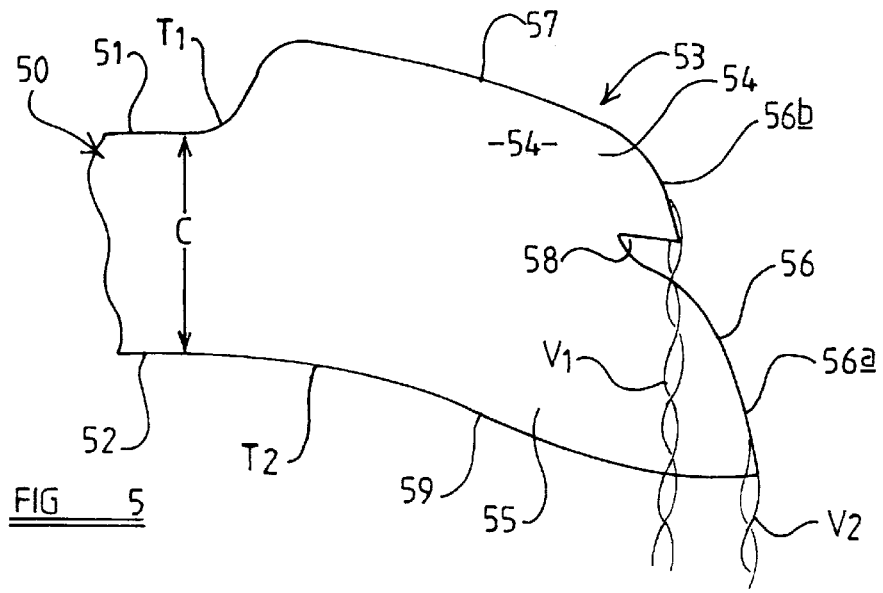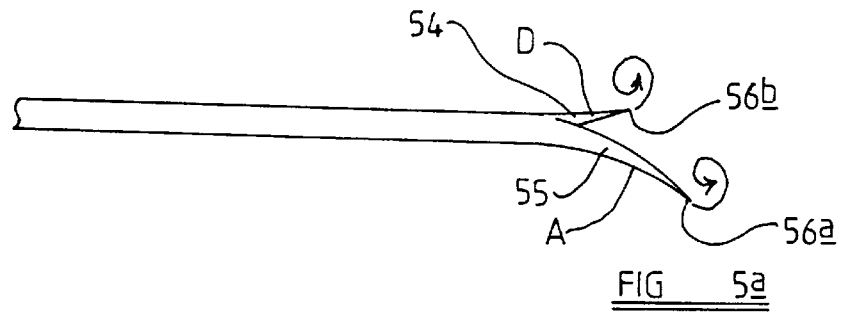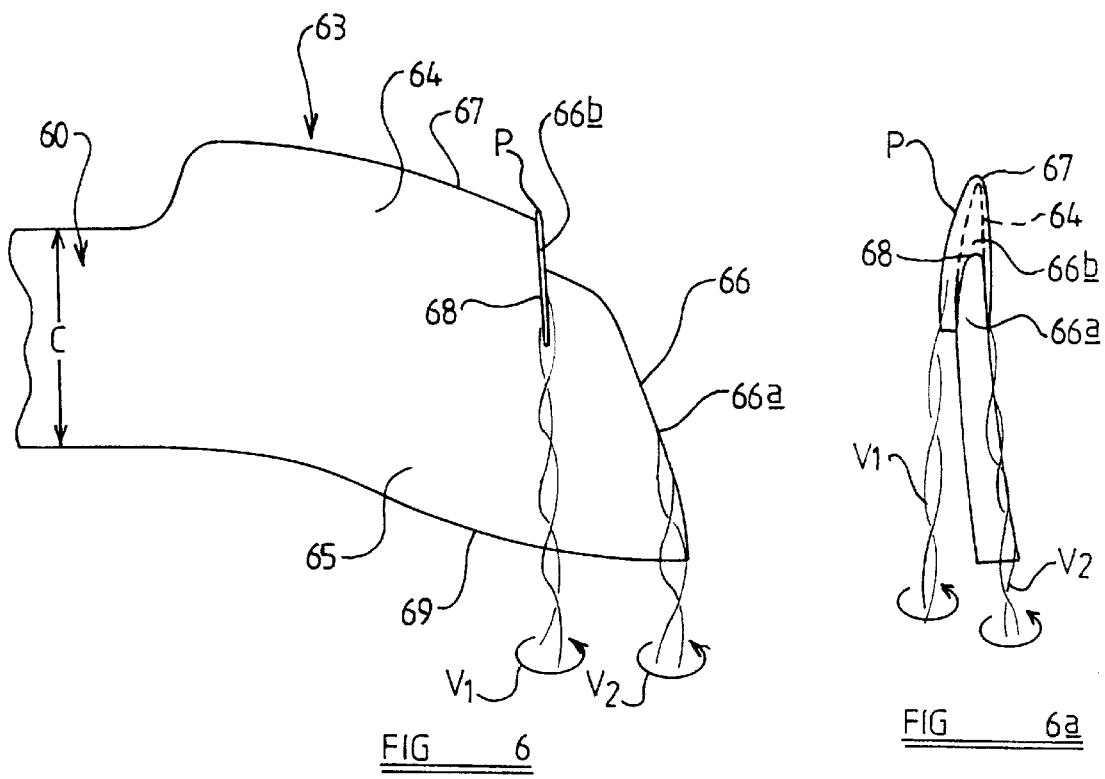

AEROFOIL

BACKGROUND OF THE INVENTION

This invention relates to an aerofoil and more particularly but not exclusively to an aerofoil comprising a rotor blade of a helicopter.

The present invention has arisen from a desire to reduce what is known as blade-slap noise which arises from rotor blade vortex interactions particularly in low speed descending or manoeuvring flight, and adversely affects the helicopter's acoustic signature and detectability.

DESCRIPTION OF THE PRIOR ART

In previous patent GB1538044 there is disclosed an advanced planform helicopter rotor blade tip which has a swept extreme tip edge which gives good high angle of attack performance on the retreating blade and also alleviates compressibility effects on the advancing rotor blade. Such a blade has been used on a helicopter which has achieved a world's speed record.

In prior European patent 0351104 there is shown a development of the rotor blade of GB 1538044 comprising the incorporation of anhedral or blade droop, along the swept extreme tip edge to alter the bound vortex distribution caused by spanwise airflow over the swept extreme tip edge so as to reduce aerodynamic pitching moments of the blade in the advancing and retreating sectors of a rotor rotational disc during forward flight of a helicopter on which the blade is fitted.

In prior European patent 0482932 there is disclosed a vane tip extending from a chordwise extending (straight) tip edge which acts to divide a tip vortex into two approximately equally tip vortices in order to reduce blade-slap noise. Desirably, to reduce blade-slap noise, the airflow over the aerofoil is split at the tip to create multiple vortices preferably of near equal strength. Desirably, these vortices are separated in a generally spanwise direction by a distance at least equal to 50 percent of blade chord dimension.

Another attempt has been made at reducing noise in an unswept tip edge, one example being disclosed in U.S. Pat. No. 4,046,336, particularly in the embodiment of FIGS. 9 and 10.

Whereas the arrangement of FIGS. 9 and 10 of U.S. Pat. No. 4,046,336 suggests a possibility, namely to arrange for an inner vortex to pass over a rear region of a tip, the inner and outer vortices are not sufficiently separated, being separated by less than half of the aerofoil chord length.

It was not immediately apparent how such blade tips which achieve reduced blade-slap noise, could be incorporated into a blade tip having a swept extreme tip edge as disclosed in EP 0351104, whilst retaining the performance advantages of such a blade.

SUMMARY OF THE INVENTION

According to one aspect of the invention we provide an aerofoil comprising a leading edge and a trailing edge defining a chord length and having an inner end adapted for attachment to an aircraft and an outer end which includes a tip which is adapted in use to divide the airflow into two generally equal vortices, one being an inner vortex and the other being an outer vortex, the inner vortex being arranged to trail from an outer edge of a forward region of the tip and pass over an upper surface of a rear region of the tip and the inner and outer vortices being spatially separated by a distance comprising greater than 0.5 of the chord length.

Thus whereas for example in the arrangement shown in EP 0482932 twin vortices may be generated, and the outer vortex trails from an outer edge of the tip whilst the inner vortex is generated from an inner, rear, edge of the tip, the inner vortex does not trail from an outer edge of a forward region of the tip and pass over a rear region of the tip. Also the applicants have found that providing an arrangement in which the inner and outer vortices are separated by at least 0.5 of the aerofoil chord length, the arrangement is more efficient at alleviating blade-slap noise compared with an arrangement such as taught in U.S. Pat. No. 4,046,336, and the invention is more particularly but not exclusively applicable where the extreme tip edge is swept, rather than straight. If greater separation than 0.5 of the chord length can be achieved and more preferably greater separation of 0.6 C, up to about 1.25 C, this is even more efficient at alleviating blade-slap noise. Utilising an arrangement according to the invention in which the inner vortex is arranged to pass over a rear region of the tip, a blade with a swept extreme tip edge and high performance can be provided which is also efficient at alleviating blade-slap noise.

In terms of an operating radius R of a rotor blade a desirable spatial vortex separation would be of the order of 3 or 4 percent R, although greater separation of up to about 10 percent R may be beneficial.

An outer edge part of the rear region of the tip preferably extends outwardly beyond an outer edge part of the forward region of the tip. Preferably the outer edge of the tip comprises a discontinuity which divides the outer edge into a first part adjacent to the rear region of the tip and a second part adjacent to the forward region, the inner vortex trailing from the outer edge of the forward region of the tip at or adjacent to the discontinuity.

The forward region of the tip may incorporate dihedral whereby the inner vortex will be raised to ensure that the inner vortex can pass over the rear region of the tip, and to facilitate and enhance separation of the inner and outer vortices. In another embodiment, a forward region of the tip may comprise a tip plate located at the discontinuity to create and raise the inner vortex to ensure that the inner vortex can pass over the rear region of the tip.

In each case, if desired, the rear region of the tip may incorporate anhedral.

The chord length of the aerofoil may be generally constant between the inner end of the aerofoil and the tip. Such configuration is particularly applicable where the aerofoil comprises a rotor blade of a helicopter, for example of a main sustaining rotor of a helicopter.

The invention allows various tip planform shapes. For example, in one arrangement, a forward edge of a forward region of the tip may extend forwardly of the adjacent leading edge of the aerofoil. There may be a smooth transition between the leading edge of the aerofoil and the forward edge of the forward region of the tip, or there may be a point of transition between the leading edge of the aerofoil and the forward edge of the forward region of the tip.

The forward edge of the tip may be arranged to sweep rearwardly from a position adjacent the transition between the leading edge of the aerofoil and the forward edge of the forward region of the tip.

Additionally and/or alternatively, the rear edge of the rear region of the tip may extend rearwardly of the adjacent trailing edge of the aerofoil. Again, there may be a smooth transition between the trailing edge of the aerofoil and the rear edge of the rear region of the tip, or there may be a point of transition between the trailing edge of the aerofoil and the rear edge of rear region of the tip.

The design of blade tip may incorporate many of the features of the blade described in prior UK patent GB1538055 or European patent 0351104.

According to a second aspect of the invention we provide an aerofoil comprising a leading edge and a trailing edge defining a chord length and having an inner end adapted for attachment to an aircraft and an outer end which includes a tip which is adapted in use to divide the airflow into two generally equal vortices, one being an inner vortex and the other being an outer vortex the tip comprising an outer extreme tip edge of a swept configuration the inner vortex being arranged to trail from an outer edge of a forward region of the tip and pass over an upper surface of a rear region of the tip.

The invention of the second aspect may have any of the features of the invention of the first aspect.

According to a third aspect of the invention we provide an aircraft comprising an aerofoil according to the first aspect of the invention.

BRIEF DESCRIPTION OF THE DRAWINGS

The invention will now be described with reference to the accompanying drawings in which:

FIGS. 1 and 2 illustrate prior art aerofoil tip configurations;

FIG. 3 is an illustrative perspective view of the tip of an aerofoil combining geometrical features of the two kinds prior art aerofoil tips shown in FIGS. 1 and 2, but not embodying the invention;

FIG. 4 is an illustrative perspective view of an embodiment of the second aspect of the invention;

FIG. 5 is an illustrative perspective view of a preferred embodiment of the first and second aspects of invention and FIG. 5a is an illustrative side view;

FIG. 6 is a view similar to FIG. 5 but of an alternative embodiment and FIG. 6a is an end view;

DESCRIPTION OF THE PRIOR ART

Figure 7:
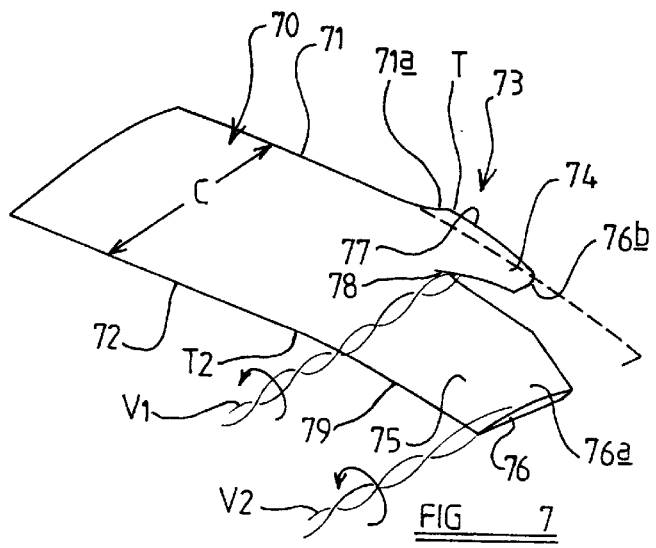
FIG. 7 is a view similar to FIGS. 5 and 6 but of another embodiment of the invention and FIG. 7a shows three alternative rear view configurations.

Referring first to FIG. 1 there is shown an aerofoil 10 comprising a leading edge 11 and a trailing edge 12. The aerofoil 10 includes a blade tip 13 including a forward region 14, and rear region 15, and an outer swept extreme tip edge 16. The rear region 15 towards the outer edge of 16 incorporates anhedral, or blade droop.

FIG. 1 shows a conventional configuration rotor blade of a main sustaining rotor of a helicopter, and a blade of this kind is more fully described in prior patent EP0351104. Such an aerofoil 10 has desirable blade performance, particularly high angle of attack performance when retreating, and the blade 10 alleviates compressibility effects as the blade 10 is advancing.

The blade 10 is adapted, at its inner or root end to be secured to the structure of an aircraft, i.e. in this case, the rotor head of a main sustaining rotor.

FIG. 2 illustrates an alternative rotor blade tip (aerofoil) configuration 20 along the lines disclosed in prior U.S. Pat. No. 5,199,851 i.e. not having an outer swept extreme tip edge. The aerofoil 20 has a leading edge 21, a trailing edge 22, and an aerofoil section chordwise between the leading 21 and trailing 22 edges. A blade tip 23 comprises a forward region 24 but a rear region of the blade tip 23 is cut away.

In the arrangement shown in FIG. 1, it can be seen that in use, in an airflow, a single vortex V trails from the rear region 15 of the tip 13 of the aerofoil 11. The impulsive interaction of a single tip vortex with a following blade is the cause of blade-slap noise.

In the arrangement of FIG. 2, the bound airflow is divided into two vortices V1 and V2 which are spatially separated from one another generally spanwise by a distance d, which preferably is at least 50 percent of the chord length C between the leading and trailing edges 21 and 22 of the aerofoil 20.

As explained in European Patent 0482932, such an aerofoil 20 is efficient at alleviating blade-slap noise.

In FIG. 3, there is illustrated an early attempt at combining the features of the aerofoils 10 and 20 of FIGS. 1 and 2 so to achieve an aerofoil 30 having a performance compatible with the existing swept extreme tip edge configuration blade 10 shown in FIG. 1, and yet alleviating blade-slap noise efficiently, as with the vane tip 23 design illustrated in FIG. 2. However, although in the arrangement of FIG. 3, twin vortices V1 and V2 are generated, an inner vortex V1 trails from a rear edge 39 of the rear region 35 of the tip 33 and an outer vortex V2 trails from the outer edge 36 of the tip 33, adjacent cut out part $35^1$. Whilst the spatial generally spanwise separation between those vortices V1, V2 was arranged to be at least 50 percent of the chord length C, the inner vortex V1 was found to be weaker than the outer vortex V2 and the full high angle of attack performance of the swept extreme tip edge configuration blade 10 shown in FIG. 1, was not achieved.

DESCRIPTION OF THE PREFERRED EMBODIMENTS

In FIG. 4, there is illustrated another attempt at combining the features of the FIG. 1 and FIG. 2 blade tips 13, 23 in which an outer swept extreme tip edge 46 of the tip 43 is provided with a discontinuity 48 such that an inner vortex V1 trails from the outer edge 46 at forward region 44 of the tip 43, and passes over a rear region 45 of the tip 43. The outer vortex V2 trails from a rear edge 49 of the tip 43. Although the arrangement divides the airflow into two generally equal vortices V1, V2, the vortices were found to be more closely spaced together spanwise of the aerofoil 40 than ideal, and with the angle of incidence of the forward region 44 set close to zero to suit an important advancing blade condition, there was a tendency for the forward region 44 to stall at high incidences, typical of a retreating blade, due to an upwash induced on an outer edge part 46a of the rear region 45 of the tip 43 of the aerofoil 40.

However, the FIG. 4 tip 43 represents a first attempt at providing a tip 43 which is not simply a combination of the geometries of the tips 13 and 23 of the aerofoils 10, 20 shown in FIGS. 1 and 2.

Referring now to FIGS. 5 and 5a there is shown a aerofoil 50 having a leading edge 51 and trailing edge 52 defining a chord length C, and a tip 53. Like with the arrangement of FIG. 4, a swept extreme tip edge 56 of the tip 53 is provided with a discontinuity 58 which divides the outer edge 56 of the tip 53 into a first part 56a which bounds a rear region 55 of the tip 53, and a second edge part 56b which bounds a forward region 54 of the tip 53 and incorporates dihedral D. In the arrangement of FIGS. 5 and 5a, a forward edge 57 of the tip 53 extends forwardly of the leading edge 51 of the aerofoil 50, and there is a smooth transition region T1 between the forward edge 57 of the tip 53 and the adjacent leading edge 51 of the aerofoil 50. Further, a rear edge 59 of the tip 53 comprises a complex curved surface which extends rearwardly of the trailing edge 52 of the aerofoil 50, and again there is a smooth transition region T2 between the rear edge 59 of the tip 53, and the trailing edge 52 of the aerofoil 50.

In the arrangement of FIG. 5, the swept configuration of the tip 56 means that the first outer edge part 56a of the rear region 55 of the tip 53 extends outwardly of the tip 53 beyond the second outer edge part 56b of the forward region 54 of the tip 53.

In this arrangement, forward region 54 of the blade tip 53 decreases in thickness towards the second outer edge part 56b.

A rear region 55 of the blade tip 53 also decreases in thickness towards the outer edge part 56a, and is provided with anhedral A.

It can be seen that an inner vortex V1 trails from the outer edge 56b at the forward region 54 of the tip 53 adjacent to the discontinuity 58 and is raised by the dihedral to pass over the upper surface of the rear region 55 of the tip 53. The outer vortex V2 trails from the rear edge 59 of the tip 53, from adjacent to the outer edge 56a of the rear region 55.

It has been found that utilising an arrangement such as shown in FIG. 5, twin vortices V1 and V2 of generally equal strength are provided, and that the spatial separation between the vortices V1 and V2 can be significantly increased compared with the arrangement shown in FIG. 4 for example i.e. by a distance well in excess of half the chord length C.

This spatial separation is achieved by a combination of spanwise and vertical separation by virtue of the first outer edge part 56a of the rear region 55 extending spanwise outwardly of the second edge part 56b of the forward region 54 of the blade tip 53, and by virtue of the inner vortex V1 being raised above the outer vortex V2, by dihedral D at the forward region 54 of the tip 55 as best illustrated in FIG. 5a, and anhedral A at the rear region 55. In another arrangement, only a dihedral on a forward region 54 of the tip 53 need be provided.

Various modifications may be made to the arrangement shown in FIG. 5. For example the particular configuration of discontinuity shown at 58, may be adapted as necessary to improve aerofoil performance and to ensure that the inner and outer vortices V1 and V2 are generally equal in strength, and are sufficiently spatially separated.

In FIGS. 6 and 6a, an arrangement of an aerofoil 60 similar to that shown in FIG. 5 is indicated, but the forward region 64 of the tip 63 is not provided with dihedral, but with a tip plate P, to form and raise the inner vortex V1 to enable it to pass over an upper surface of the rear region 65 of the tip 63.

The tip plate P extends chordwise of the aerofoil 60 and is positioned at a second edge part 66b of the swept extreme tip edge 66. The tip plate P extends forwardly slightly of the adjacent forward tip edge 67, and is slightly thicker than the aerofoil section of the tip 63.

The tip plate P, where it meets the first edge part 66a provides a discontinuity 68 from which trails the inner vortex V1, the tip plate P acting to raise the inner vortex V1 to enable it to pass over an upper surface of the rear region 65 of the tip 63. The tip plate P is positioned sufficiently inwardly of the swept extreme tip edge 66, to ensure spanwise separation between the inner and outer vortices V1, V2 of at least a half of the chord length C of the aerofoil 60.

In FIG. 7 an aerofoil 70 is shown in which a forward region 74 of the tip 73 is provided with dihedral D. In this arrangement, there is a discontinuity 78 separating the edge 76 of the tip 73 into two parts 76a, 76b, and a first edge part 76a of the tip 73 extends outwardly of a second edge part 76b a substantial distance, so as to provide the required spatial separation between an inner vortex V1 which trails from the second edge part 76b and passes over an upper surface of the rear region 75 of the tip 73, and a second vortex V2 which trails from rear edge 79 of the tip 73 adjacent the first outer edge part 76a of at least half the chord length C. Again, the spatial separation results from a combination of spanwise and vertical separation.

Figure 7A:
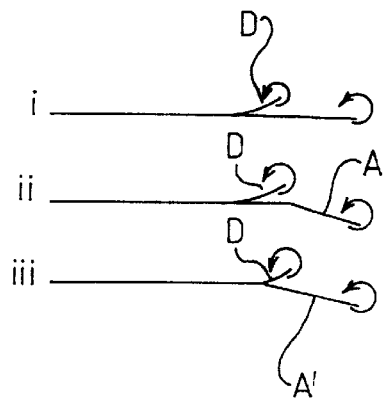

In FIG. 7a three alternative configurations are shown in which the rear region 75 of the tip 73 is provided either with no anhedral (7a(i)), or with anhedral A of a first configuration (7a(ii)), or an alternative anhedral $A^1$ (7a(iii)).

In the arrangement of FIG. 7, although the forward edge 77 of the tip 73 extends slightly forwardly of leading edge 71 of the aerofoil 70, this is only marginal, and there is a point of transition T where the forward edge 77 meets an adjacent leading edge part 71a of the leading edge 71.

Again, as with the arrangements of the invention so far described, rear edge 79 of the tip 73 extends rearwardly of the trailing edge 72 of the aerofoil 70, and there is a smooth transition region T2 between the rear edge 77 of the tip 73 and the trailing edge 72 of the aerofoil 70.

Figure 8:
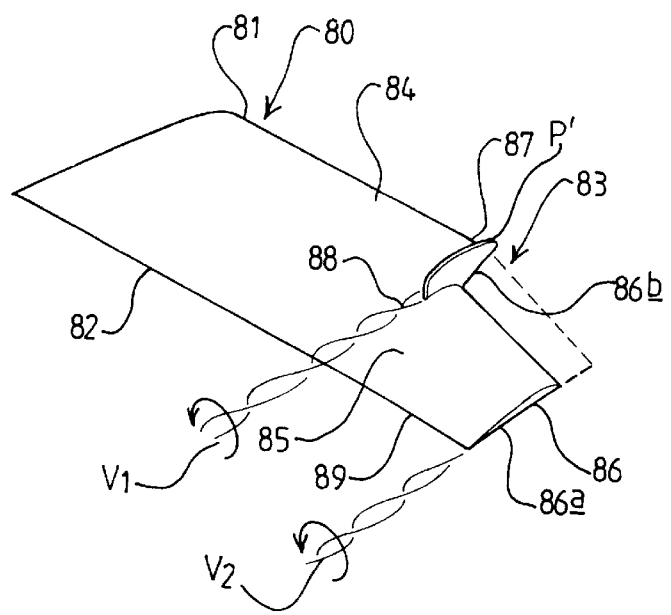
FIG. 8 is a view similar to FIG. 7 but of yet another embodiment of the invention.

FIG. 8 shows an aerofoil 80 in which a forward edge 87 of the tip 83 does not extend forwardly of a leading edge 81 of the aerofoil 80, and a rear edge 89 of the tip 83 does not extend rearwardly of the trailing edge 82 of the aerofoil 80.

Yet another alternative configuration of discontinuity 88 in the outer edge 86 of the tip is shown provided by a tip plate $P^1$ rather than dihedral, to divide the outer edge 86 into a first outer edge part 86a and a second outer part 86b. The rear region 85 of the tip 83 may be provided with anhedral but need not be provided with anhedral if this is not required. The tip plate $P^1$ may be of a similar configuration to tip plate P of FIG. 6 and 6a, such that a first tip vortex V1 trails from the second edge part 86b of forward region 84 of the tip 83 from a position adjacent the discontinuity 88 and passes over the rear region 85 of the blade tip 83, whilst a second outer, tip vortex V2 of generally equal strength is generated at the rear edge 89 of the blade tip 83 preferably adjacent the first edge part 86a of the outer edge 86 such that the vortices V1 and V2 are sufficiently spatially separated.

In an unillustrated embodiment, that part of the tip plate P, $P^1$ extending above the upper surface of the adjacent forward region 64, 84 of the tip can be curved, either radially inwardly or radially outwardly, to assist the formation of the inner vortex V1.

Various other planform designs which incorporate the invention may no doubt be provided.

Although the invention has been described with reference to an aerofoil comprising a helicopter main sustaining rotor blade, the invention may be applied to any other aerofoil where it is designed to divide bound airflow into two generally equal spanwise separated vortices.

For example, the invention may be applied to the rotor blades of a prop-rotor on a tilt rotor a tilt wing aircraft which are known to have a problem associated with blade-slap noise.

In another application the invention may be applied to an aerofoil such as a fixed wing of an aircraft.

Whilst fixed wing aircraft do not suffer from blade-slap noise problems, the invention could be useful in dividing the vortices which extend from the wing tips effectively to reduce the strength of the normal single vortices in the near wake and which remain for a significant time in the far wake, thereby reducing turbulence which can adversely affect following aircraft, for example, in approach to landing, or an aircraft crossing behind the flight path. Particularly but not exclusively, in this event, the aerofoil need not be of a constant chord width (C) between its leading and trailing edges, in which case 'chord length' in this specification would refer to the mean chord length of the aerofoil.

We claim:

1. An aerofoil comprising a leading edge and a trailing edge defining a chord length and having an inner end adapted for attachment to an aircraft and an outer end which includes a tip which is adapted in use to divide the airflow into two generally equal vortices, one being an inner vortex and the other being an outer vortex; the inner vortex being arranged to trail from an outer edge of a forward region of the tip and pass over an upper surface of a rear region of the tip and the inner and outer vortices being spatially separated by a distance greater than 0.6 of the chord length, an extreme outer tip edge of the rear region of the tip being of an outwardly and rearwardly swept configuration.

2. An aerofoil according to claim 1 wherein the outer vortex is arranged to trail from a rear edge of the tip.

3. An aerofoil according to claim 1 wherein a part of the outer edge of the rear region of the tip extends outwardly beyond the outer edge of the forward region of the tip.

4. An aerofoil according to claim 3 wherein between the forward and rear regions of the tip there is a discontinuity which divides an outer edge of the tip into a first part adjacent to the rear region of the tip and a second part adjacent to the forward region of the tip, the inner vortex trailing from the outer edge of the forward region of the tip at a position at or adjacent to the discontinuity.

5. An aerofoil according to claim 1 wherein the forward region of the tip incorporates dihedral.

6. An aerofoil according to claim 1 wherein the forward region of the tip comprises a tip plate.

7. An aerofoil according to claim 1 wherein the rear region of the tip comprises anhedral.

8. An aerofoil according to claim 1 wherein the chord length of the aerofoil is generally constant between the inner end and the tip.

9. An aerofoil according to claim 1 wherein a forward edge of the forward region of the tip extends forwardly of an adjacent leading edge of the aerofoil.

10. An aerofoil according to claim 9 wherein there is a smooth transition between the leading edge of the aerofoil and the forward edge of the forward region of the tip.

11. An aerofoil according to claim 9 wherein there is a point of transition between the leading edge of the aerofoil and the forward edge of the forward region of the tip.

12. An aerofoil according to claim 1 wherein a forward edge of the tip sweeps rearwardly from a position adjacent the transition between the leading edge of the aerofoil and the tip.

13. An aerofoil according to claim 12 wherein there is a smooth transition between the trailing edge of the aerofoil and a rear edge of the rear region of the tip.

14. An aerofoil according to claim 1 wherein a rear edge of the rear region of the tip extends rearwardly of the adjacent trailing edge of the aerofoil.

15. An aerofoil according to claim 14 wherein there is a point of transition between the trailing edge of the aerofoil and the rear edge of the rear region of the tip.

* * * * *